(12) United States Patent
Case

(10) Patent No.: US 7,623,264 B2
(45) Date of Patent: Nov. 24, 2009

(54) METHOD FOR COLORIZING A DIGITAL HALFTONE

(76) Inventor: Robert M. Case, 2205 Potters Creek Rd., Canyon Lake, TX (US) 78133-3210

( * ) Notice: Subject to any disclaimer, the term of this patent is extended or adjusted under 35 U.S.C. 154(b) by 633 days.

(21) Appl. No.: 11/356,616

(22) Filed: Feb. 17, 2006

(65) Prior Publication Data

US 2007/0195339 A1    Aug. 23, 2007

(51) Int. Cl.
*G06F 15/00* (2006.01)
(52) U.S. Cl. .................. 358/1.9; 358/3.06; 358/534
(58) Field of Classification Search ............ 358/1.1, 358/1.9, 2.1, 3.01, 3.06, 501, 515, 518, 520, 358/534; 382/162, 167
See application file for complete search history.

(56) References Cited

U.S. PATENT DOCUMENTS

| | | | |
|---|---|---|---|
| 4,742,400 A * | 5/1988 | Tsuji | ......................... 358/3.19 |
| 5,504,846 A | 4/1996 | Fisher | |
| 5,991,512 A | 11/1999 | Shaked et al. | |
| 6,002,493 A | 12/1999 | Case | |
| 6,031,626 A | 2/2000 | Shu et al. | |
| 6,844,941 B1 | 1/2005 | Sharma et al. | |
| 2005/0179950 A1 | 8/2005 | Case | |

FOREIGN PATENT DOCUMENTS

| | | |
|---|---|---|
| EP | 0637886 A2 | 8/1995 |
| EP | 0863019 A1 | 9/1998 |

OTHER PUBLICATIONS

Color System.com; "James Clerck Maxwell"; pp. 1-3 Jan. 19, 2006; http://www.colorsystem.com/projekte/engl/19wwweicm.

Wikipedia.org; "Color Space"; pp. 1-4 Jan. 19, 2006; http://en.wikipedia.org/wiki/color_space.
Hyperphysics.Phy-Astr.gsu.edu; "The CIE Color Space" pp. 1-4; Jan. 19, 2006; http:hyperphysics.phy-astr.gsu.edu/hhass/vision/cie.htm.

* cited by examiner

*Primary Examiner*—Thomas D Lee
(74) *Attorney, Agent, or Firm*—Stolowitz Ford Cowger LLP

(57) ABSTRACT

An improved method for colorizing a digital halftone that uses both input color density and output halftone luminance to quantize and relocate color thereby reducing digital storage and transmission overhead capacity. The method utilizes a synergy between color and luminance inherent within the input image to enable the available space for color within the output luminance halftone to not exceed that necessary to allocate all of the input color information.

An input color image is digitally reproduced using a separation of input primary color information from input grayscale information. A digital halftone, derived from the grayscale or luminance channel of a four-channel input image, is colorized by the invention's method of processing the remaining three additive or subtractive primary color channels. The halftone's two output colors are designated "black" and "transparent." The three color channels are combined, quantized and assigned to localized output bitmap segments each described by three bits, one for each primary color. Each segment's three-bit descriptor is assigned to all transparent pixels contained within the corresponding multi-pixel cell of the digital halftone.

As a result, output file size is decreased while relative accuracy of color placement is maintained. Both the original halftone file and the colorization file then may be stored or transmitted following which they are combined for display by a computer monitor or printer.

14 Claims, 22 Drawing Sheets

|   | 0 | 1 | 2 | 3 | 4 | 5 | 6 | 7 |
|---|---|---|---|---|---|---|---|---|
| 0 | C=0.05<br>M=0.00<br>Y=0.36<br>K=0.85 | C=0.00<br>M=0.10<br>Y=0.38<br>K=0.84 | C=0.09<br>M=0.00<br>Y=0.34<br>K=0.83 | C=0.11<br>M=0.00<br>Y=0.45<br>K=0.83 | C=0.00<br>M=0.02<br>Y=0.46<br>K=0.82 | C=0.00<br>M=0.19<br>Y=0.62<br>K=0.85 | C=0.00<br>M=0.38<br>Y=0.72<br>K=0.80 | C=0.00<br>M=0.55<br>Y=0.71<br>K=0.62 |
| 1 | C=0.02<br>M=0.00<br>Y=0.45<br>K=0.84 | C=0.07<br>M=0.00<br>Y=0.46<br>K=0.84 | C=0.22<br>M=0.00<br>Y=0.53<br>K=0.84 | C=0.18<br>M=0.00<br>Y=0.47<br>K=0.82 | C=0.07<br>M=0.00<br>Y=0.39<br>K=0.83 | C=0.04<br>M=0.00<br>Y=0.31<br>K=0.82 | C=0.00<br>M=0.18<br>Y=0.64<br>K=0.85 | C=0.00<br>M=0.41<br>Y=0.73<br>K=0.74 |
| 2 | C=0.19<br>M=0.00<br>Y=0.56<br>K=0.83 | C=0.12<br>M=0.00<br>Y=0.56<br>K=0.84 | C=0.11<br>M=0.00<br>Y=0.44<br>K=0.82 | C=0.17<br>M=0.00<br>Y=0.48<br>K=0.81 | C=0.00<br>M=0.00<br>Y=0.65<br>K=0.85 | C=0.04<br>M=0.00<br>Y=0.46<br>K=0.82 | C=0.00<br>M=0.08<br>Y=0.53<br>K=0.85 | C=0.00<br>M=0.27<br>Y=0.83<br>K=0.84 |
| 3 | C=0.18<br>M=0.00<br>Y=0.51<br>K=0.82 | C=0.07<br>M=0.00<br>Y=0.40<br>K=0.83 | C=0.02<br>M=0.00<br>Y=0.37<br>K=0.83 | C=0.17<br>M=0.00<br>Y=0.44<br>K=0.81 | C=0.00<br>M=0.02<br>Y=0.45<br>K=0.81 | C=0.00<br>M=0.04<br>Y=0.47<br>K=0.81 | C=0.00<br>M=0.13<br>Y=0.49<br>K=0.79 | C=0.00<br>M=0.12<br>Y=0.45<br>K=0.77 |
| 4 | C=0.04<br>M=0.00<br>Y=0.48<br>K=0.82 | C=0.07<br>M=0.00<br>Y=0.45<br>K=0.84 | C=0.00<br>M=0.02<br>Y=0.49<br>K=0.82 | C=0.00<br>M=0.06<br>Y=0.57<br>K=0.83 | C=0.00<br>M=0.06<br>Y=0.46<br>K=0.81 | C=0.00<br>M=0.04<br>Y=0.50<br>K=0.82 | C=0.00<br>M=0.12<br>Y=0.62<br>K=0.80 | C=0.00<br>M=0.17<br>Y=0.65<br>K=0.81 |
| 5 | C=0.06<br>M=0.00<br>Y=0.45<br>K=0.82 | C=0.00<br>M=0.02<br>Y=0.43<br>K=0.83 | C=0.00<br>M=0.00<br>Y=0.60<br>K=0.84 | C=0.00<br>M=0.02<br>Y=0.58<br>K=0.80 | C=0.00<br>M=0.04<br>Y=0.54<br>K=0.80 | C=0.00<br>M=0.16<br>Y=0.80<br>K=0.83 | C=0.00<br>M=0.32<br>Y=0.98<br>K=0.83 | C=0.00<br>M=0.42<br>Y=0.98<br>K=0.81 |
| 6 | C=0.00<br>M=0.07<br>Y=0.57<br>K=0.79 | C=0.00<br>M=0.14<br>Y=0.53<br>K=0.77 | C=0.00<br>M=0.24<br>Y=0.75<br>K=0.80 | C=0.00<br>M=0.24<br>Y=0.71<br>K=0.77 | C=0.00<br>M=0.30<br>Y=0.91<br>K=0.79 | C=0.00<br>M=0.37<br>Y=1.00<br>K=0.82 | C=0.00<br>M=0.31<br>Y=0.84<br>K=0.65 | C=0.00<br>M=0.20<br>Y=0.59<br>K=0.44 |
| 7 | C=0.00<br>M=0.06<br>Y=0.60<br>K=0.80 | C=0.00<br>M=0.39<br>Y=1.00<br>K=0.84 | C=0.00<br>M=0.46<br>Y=1.00<br>K=0.80 | C=0.00<br>M=0.46<br>Y=1.00<br>K=0.70 | C=0.00<br>M=0.22<br>Y=0.62<br>K=0.47 | C=0.00<br>M=0.14<br>Y=0.32<br>K=0.07 | C=0.00<br>M=0.07<br>Y=0.33<br>K=0.01 | C=0.00<br>M=0.00<br>Y=0.06<br>K=0.00 |

*FIG 2A*

|  | 8 | 9 | 10 | 11 | 12 | 13 | 14 | 15 | |
|---|---|---|---|---|---|---|---|---|---|
| | C=0.00<br>M=0.73<br>Y=0.83<br>K=0.55 | C=0.00<br>M=0.78<br>Y=0.85<br>K=0.51 | C=0.00<br>M=0.76<br>Y=0.83<br>K=0.50 | C=0.00<br>M=0.77<br>Y=0.83<br>K=0.56 | C=0.00<br>M=0.81<br>Y=0.88<br>K=0.55 | C=0.00<br>M=0.87<br>Y=0.95<br>K=0.54 | C=0.00<br>M=0.76<br>Y=0.80<br>K=0.42 | C=0.00<br>M=0.73<br>Y=0.76<br>K=0.00 | 0 |
| | C=0.00<br>M=0.55<br>Y=0.68<br>K=0.58 | C=0.00<br>M=0.70<br>Y=0.83<br>K=0.56 | C=0.00<br>M=0.75<br>Y=0.84<br>K=0.54 | C=0.00<br>M=0.78<br>Y=0.83<br>K=0.55 | C=0.00<br>M=0.80<br>Y=0.87<br>K=0.54 | C=0.00<br>M=0.80<br>Y=0.83<br>K=0.50 | C=0.00<br>M=0.78<br>Y=0.83<br>K=0.45 | C=0.00<br>M=0.74<br>Y=0.82<br>K=0.43 | 1 |
| | C=0.00<br>M=0.48<br>Y=0.67<br>K=0.68 | C=0.00<br>M=0.58<br>Y=0.74<br>K=0.54 | C=0.00<br>M=0.72<br>Y=0.80<br>K=0.53 | C=0.00<br>M=0.79<br>Y=0.87<br>K=0.57 | C=0.00<br>M=0.75<br>Y=0.83<br>K=0.51 | C=0.00<br>M=0.73<br>Y=0.84<br>K=0.50 | C=0.00<br>M=0.75<br>Y=0.84<br>K=0.47 | C=0.00<br>M=0.78<br>Y=0.89<br>K=0.49 | 2 |
| | C=0.00<br>M=0.26<br>Y=0.64<br>K=0.76 | C=0.00<br>M=0.45<br>Y=0.69<br>K=0.64 | C=0.00<br>M=0.63<br>Y=0.79<br>K=0.56 | C=0.00<br>M=0.67<br>Y=0.81<br>K=0.51 | C=0.00<br>M=0.74<br>Y=0.84<br>K=0.53 | C=0.00<br>M=0.81<br>Y=0.91<br>K=0.59 | C=0.00<br>M=0.89<br>Y=1.00<br>K=0.61 | C=0.00<br>M=0.91<br>Y=0.99<br>K=0.61 | 3 |
| | C=0.00<br>M=0.16<br>Y=0.57<br>K=0.80 | C=0.00<br>M=0.35<br>Y=0.70<br>K=0.76 | C=0.00<br>M=0.54<br>Y=0.78<br>K=0.62 | C=0.00<br>M=0.76<br>Y=1.00<br>K=0.61 | C=0.00<br>M=0.83<br>Y=1.00<br>K=0.61 | C=0.00<br>M=0.87<br>Y=1.00<br>K=0.63 | C=0.00<br>M=0.74<br>Y=0.99<br>K=0.58 | C=0.00<br>M=0.62<br>Y=0.86<br>K=0.53 | 4 |
| | C=0.00<br>M=0.33<br>Y=0.91<br>K=0.74 | C=0.00<br>M=0.33<br>Y=0.82<br>K=0.71 | C=0.00<br>M=0.37<br>Y=0.68<br>K=0.55 | C=0.00<br>M=0.40<br>Y=0.65<br>K=0.45 | C=0.00<br>M=0.40<br>Y=0.66<br>K=0.36 | C=0.00<br>M=0.35<br>Y=0.64<br>K=0.29 | C=0.00<br>M=0.24<br>Y=0.46<br>K=0.15 | C=0.00<br>M=0.16<br>Y=0.42<br>K=0.07 | 5 |
| | C=0.00<br>M=0.13<br>Y=0.38<br>K=0.16 | C=0.00<br>M=0.12<br>Y=0.30<br>K=0.00 | C=0.00<br>M=0.07<br>Y=0.31<br>K=0.00 | C=0.00<br>M=0.07<br>Y=0.30<br>K=0.00 | C=0.00<br>M=0.04<br>Y=0.28<br>K=0.00 | C=0.00<br>M=0.07<br>Y=0.32<br>K=0.00 | C=0.00<br>M=0.00<br>Y=0.25<br>K=0.01 | C=0.00<br>M=0.07<br>Y=0.35<br>K=0.00 | 6 |
| | C=0.00<br>M=0.00<br>Y=0.13<br>K=0.00 | C=0.00<br>M=0.00<br>Y=0.14<br>K=0.00 | C=0.00<br>M=0.10<br>Y=0.37<br>K=0.02 | C=0.00<br>M=0.08<br>Y=0.39<br>K=0.04 | C=0.00<br>M=0.10<br>Y=0.42<br>K=0.00 | C=0.00<br>M=0.10<br>Y=0.44<br>K=0.02 | C=0.00<br>M=0.10<br>Y=0.42<br>K=0.01 | C=0.00<br>M=0.10<br>Y=0.43<br>K=0.03 | 7 |

FIG 2B

| | 0 | 1 | 2 | 3 | 4 | 5 | 6 | 7 |
|---|---|---|---|---|---|---|---|---|
| 8 | C=0.00<br>M=0.31<br>Y=0.82<br>K=0.72 | C=0.00<br>M=0.29<br>Y=0.78<br>K=0.60 | C=0.00<br>M=0.19<br>Y=0.46<br>K=0.24 | C=0.00<br>M=0.15<br>Y=0.41<br>K=0.02 | C=0.00<br>M=0.02<br>Y=0.30<br>K=0.00 | C=0.00<br>M=0.03<br>Y=0.30<br>K=0.00 | C=0.00<br>M=0.06<br>Y=0.32<br>K=0.00 | C=0.00<br>M=0.05<br>Y=0.29<br>K=0.00 |
| 9 | C=0.00<br>M=0.17<br>Y=0.50<br>K=0.23 | C=0.00<br>M=0.14<br>Y=0.38<br>K=0.00 | C=0.00<br>M=0.09<br>Y=0.39<br>K=0.00 | C=0.00<br>M=0.07<br>Y=0.36<br>K=0.01 | C=0.00<br>M=0.08<br>Y=0.37<br>K=0.03 | C=0.00<br>M=0.03<br>Y=0.30<br>K=0.00 | C=0.00<br>M=0.08<br>Y=0.34<br>K=0.05 | C=0.00<br>M=0.06<br>Y=0.33<br>K=0.06 |
| 10 | C=0.00<br>M=0.11<br>Y=0.36<br>K=0.00 | C=0.00<br>M=0.05<br>Y=0.33<br>K=0.00 | C=0.00<br>M=0.08<br>Y=0.38<br>K=0.06 | C=0.00<br>M=0.08<br>Y=0.36<br>K=0.01 | C=0.00<br>M=0.06<br>Y=0.34<br>K=0.01 | C=0.00<br>M=0.07<br>Y=0.34<br>K=0.04 | C=0.00<br>M=0.08<br>Y=0.34<br>K=0.06 | C=0.00<br>M=0.08<br>Y=0.39<br>K=0.05 |
| 11 | C=0.00<br>M=0.04<br>Y=0.29<br>K=0.00 | C=0.00<br>M=0.04<br>Y=0.29<br>K=0.05 | C=0.00<br>M=0.08<br>Y=0.31<br>K=0.02 | C=0.00<br>M=0.09<br>Y=0.35<br>K=0.04 | C=0.00<br>M=0.06<br>Y=0.30<br>K=0.00 | C=0.00<br>M=0.12<br>Y=0.42<br>K=0.07 | C=0.00<br>M=0.09<br>Y=0.41<br>K=0.04 | C=0.00<br>M=0.07<br>Y=0.36<br>K=0.02 |
| 12 | C=0.00<br>M=0.04<br>Y=0.27<br>K=0.00 | C=0.00<br>M=0.05<br>Y=0.28<br>K=0.03 | C=0.00<br>M=0.05<br>Y=0.24<br>K=0.00 | C=0.00<br>M=0.07<br>Y=0.31<br>K=0.05 | C=0.00<br>M=0.08<br>Y=0.40<br>K=0.09 | C=0.00<br>M=0.10<br>Y=0.43<br>K=0.10 | C=0.00<br>M=0.08<br>Y=0.35<br>K=0.00 | C=0.00<br>M=0.10<br>Y=0.44<br>K=0.03 |
| 13 | C=0.00<br>M=0.06<br>Y=0.33<br>K=0.02 | C=0.00<br>M=0.08<br>Y=0.31<br>K=0.01 | C=0.00<br>M=0.00<br>Y=0.16<br>K=0.00 | C=0.00<br>M=0.08<br>Y=0.33<br>K=0.03 | C=0.00<br>M=0.07<br>Y=0.34<br>K=0.00 | C=0.00<br>M=0.09<br>Y=0.36<br>K=0.05 | C=0.00<br>M=0.10<br>Y=0.40<br>K=0.04 | C=0.00<br>M=0.11<br>Y=0.43<br>K=0.07 |
| 14 | C=0.00<br>M=0.11<br>Y=0.47<br>K=0.14 | C=0.00<br>M=0.08<br>Y=0.39<br>K=0.08 | C=0.00<br>M=0.08<br>Y=0.36<br>K=0.04 | C=0.00<br>M=0.10<br>Y=0.36<br>K=0.05 | C=0.00<br>M=0.06<br>Y=0.31<br>K=0.00 | C=0.00<br>M=0.08<br>Y=0.34<br>K=0.01 | C=0.00<br>M=0.10<br>Y=0.42<br>K=0.09 | C=0.00<br>M=0.10<br>Y=0.39<br>K=0.05 |
| 15 | C=0.00<br>M=0.09<br>Y=0.44<br>K=0.06 | C=0.00<br>M=0.09<br>Y=0.36<br>K=0.02 | C=0.00<br>M=0.08<br>Y=0.36<br>K=0.04 | C=0.00<br>M=0.07<br>Y=0.37<br>K=0.05 | C=0.00<br>M=0.08<br>Y=0.40<br>K=0.07 | C=0.00<br>M=0.08<br>Y=0.34<br>K=0.07 | C=0.00<br>M=0.08<br>Y=0.34<br>K=0.05 | C=0.00<br>M=0.09<br>Y=0.40<br>K=0.04 |

FIG 2C

| | | | | | | | | |
|---|---|---|---|---|---|---|---|---|
| C=0.00<br>M=0.06<br>Y=0.33<br>K=0.06 | C=0.00<br>M=0.08<br>Y=0.34<br>K=0.02 | C=0.00<br>M=0.10<br>Y=0.42<br>K=0.11 | C=0.00<br>M=0.11<br>Y=0.45<br>K=0.07 | C=0.00<br>M=0.12<br>Y=0.50<br>K=0.11 | C=0.00<br>M=0.12<br>Y=0.52<br>K=0.07 | C=0.00<br>M=0.12<br>Y=0.49<br>K=0.04 | C=0.00<br>M=0.11<br>Y=0.50<br>K=0.07 | 8 |
| C=0.00<br>M=0.07<br>Y=0.33<br>K=0.01 | C=0.00<br>M=0.07<br>Y=0.34<br>K=0.00 | C=0.00<br>M=0.07<br>Y=0.37<br>K=0.04 | C=0.00<br>M=0.11<br>Y=0.48<br>K=0.11 | C=0.00<br>M=0.17<br>Y=0.64<br>K=0.13 | C=0.00<br>M=0.16<br>Y=0.62<br>K=0.10 | C=0.00<br>M=0.18<br>Y=0.62<br>K=0.11 | C=0.00<br>M=0.17<br>Y=0.58<br>K=0.07 | 9 |
| C=0.00<br>M=0.10<br>Y=0.44<br>K=0.13 | C=0.00<br>M=0.10<br>Y=0.42<br>K=0.06 | C=0.00<br>M=0.10<br>Y=0.42<br>K=0.01 | C=0.00<br>M=0.12<br>Y=0.48<br>K=0.02 | C=0.00<br>M=0.17<br>Y=0.61<br>K=0.07 | C=0.00<br>M=0.19<br>Y=0.67<br>K=0.11 | C=0.00<br>M=0.18<br>Y=0.68<br>K=0.18 | C=0.00<br>M=0.19<br>Y=0.63<br>K=0.07 | 10 |
| C=0.00<br>M=0.11<br>Y=0.41<br>K=0.06 | C=0.00<br>M=0.11<br>Y=0.50<br>K=0.09 | C=0.00<br>M=0.13<br>Y=0.50<br>K=0.07 | C=0.00<br>M=0.13<br>Y=0.55<br>K=0.08 | C=0.00<br>M=0.14<br>Y=0.59<br>K=0.09 | C=0.00<br>M=0.20<br>Y=0.67<br>K=0.14 | C=0.00<br>M=0.19<br>Y=0.64<br>K=0.11 | C=0.00<br>M=0.19<br>Y=0.65<br>K=0.11 | 11 |
| C=0.00<br>M=0.10<br>Y=0.42<br>K=0.06 | C=0.00<br>M=0.13<br>Y=0.53<br>K=0.09 | C=0.00<br>M=0.13<br>Y=0.50<br>K=0.07 | C=0.00<br>M=0.16<br>Y=0.54<br>K=0.07 | C=0.00<br>M=0.19<br>Y=0.64<br>K=0.10 | C=0.00<br>M=0.19<br>Y=0.62<br>K=0.02 | C=0.00<br>M=0.19<br>Y=0.67<br>K=0.09 | C=0.00<br>M=0.19<br>Y=0.68<br>K=0.09 | 12 |
| C=0.00<br>M=0.11<br>Y=0.42<br>K=0.00 | C=0.00<br>M=0.11<br>Y=0.45<br>K=0.07 | C=0.00<br>M=0.11<br>Y=0.45<br>K=0.04 | C=0.00<br>M=0.15<br>Y=0.56<br>K=0.09 | C=0.00<br>M=0.16<br>Y=0.59<br>K=0.11 | C=0.00<br>M=0.19<br>Y=0.70<br>K=0.15 | C=0.00<br>M=0.19<br>Y=0.67<br>K=0.09 | C=0.00<br>M=0.22<br>Y=0.71<br>K=0.11 | 13 |
| C=0.00<br>M=0.09<br>Y=0.39<br>K=0.04 | C=0.00<br>M=0.12<br>Y=0.46<br>K=0.07 | C=0.00<br>M=0.12<br>Y=0.44<br>K=0.06 | C=0.00<br>M=0.10<br>Y=0.42<br>K=0.02 | C=0.00<br>M=0.13<br>Y=0.47<br>K=0.01 | C=0.00<br>M=0.18<br>Y=0.61<br>K=0.08 | C=0.00<br>M=0.18<br>Y=0.65<br>K=0.06 | C=0.00<br>M=0.19<br>Y=0.64<br>K=0.11 | 14 |
| C=0.00<br>M=0.09<br>Y=0.39<br>K=0.03 | C=0.00<br>M=0.10<br>Y=0.40<br>K=0.04 | C=0.00<br>M=0.10<br>Y=0.44<br>K=0.05 | C=0.00<br>M=0.10<br>Y=0.37<br>K=0.02 | C=0.00<br>M=0.11<br>Y=0.48<br>K=0.06 | C=0.00<br>M=0.19<br>Y=0.68<br>K=0.14 | C=0.00<br>M=0.22<br>Y=0.67<br>K=0.07 | C=0.00<br>M=0.19<br>Y=0.68<br>K=0.11 | 15 |
| 8 | 9 | 10 | 11 | 12 | 13 | 14 | 15 | |

*FIG 2D*

|   | 1 | 2 | 3 | 4 |
|---|---|---|---|---|
| A | C=1.77<br>M=0.10<br>Y=7.20 | C=0.15<br>M=2.39<br>Y=8.91 | C=0.00<br>M=10.40<br>Y=12.53 | C=0.00<br>M=12.65<br>Y=13.88 |
| B | C=0.17<br>M=2.18<br>Y=10.21 | C=0.00<br>M=2.94<br>Y=10.20 | C=0.00<br>M=3.81<br>Y=8.43 | C=0.00<br>M=4.79<br>Y=8.94 |
| C | C=0.00<br>M=1.98<br>Y=6.77 | C=0.00<br>M=1.04<br>Y=5.45 | C=0.00<br>M=1.57<br>Y=6.78 | C=0.00<br>M=2.60<br>Y=9.61 |
| D | C=0.00<br>M=1.13<br>Y=5.34 | C=0.00<br>M=1.40<br>Y=6.09 | C=0.00<br>M=1.82<br>Y=7.18 | C=0.00<br>M=2.91<br>Y=10.16 |

*FIG 4A*

|   | 1 | 2 | 3 | 4 |
|---|---|---|---|---|
| A | B=13<br>T=3 | B=13<br>T=3 | B=9<br>T=7 | B=8<br>T=8 |
| B | B=13<br>T=3 | B=10<br>T=6 | B=6<br>T=10 | B=3<br>T=13 |
| C | B=2<br>T=14 | B=0<br>T=16 | B=1<br>T=15 | B=1<br>T=15 |
| D | B=1<br>T=15 | B=1<br>T=15 | B=1<br>T=15 | B=1<br>T=15 |

*FIG 5*

|   | 1 | 2 | 3 | 4 |
|---|---|---|---|---|
| A | C=1<br>M=0<br>Y=1 | C=0<br>M=0<br>Y=1 | C=0<br>M=1<br>Y=1 | C=0<br>M=1<br>Y=1 |
| B | C=0<br>M=0<br>Y=1 | C=0<br>M=1<br>Y=1 | C=0<br>M=1<br>Y=1 | C=0<br>M=1<br>Y=1 |
| C | C=0<br>M=0<br>Y=1 | C=0<br>M=0<br>Y=0 | C=0<br>M=0<br>Y=1 | C=0<br>M=0<br>Y=1 |
| D | C=0<br>M=0<br>Y=0 | C=0<br>M=0<br>Y=1 | C=0<br>M=0<br>Y=1 | C=0<br>M=1<br>Y=1 |

*FIG 6*

|   | 0 | 1 | 2 | 3 | 4 | 5 | 6 | 7 |
|---|---|---|---|---|---|---|---|---|
| 0 | C=0<br>M=0<br>Y=0<br>K=1 | C=0<br>M=0<br>Y=0<br>K=1 | C=0<br>M=0<br>Y=0<br>K=1 | C=1<br>M=0<br>Y=1<br>K=0 | C=0<br>M=0<br>Y=0<br>K=1 | C=0<br>M=0<br>Y=0<br>K=1 | C=0<br>M=0<br>Y=0<br>K=1 | C=0<br>M=0<br>Y=1<br>K=0 |
| 1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 |
| 2 | C=0<br>M=0<br>Y=0<br>K=1 | C=0<br>M=0<br>Y=0<br>K=1 | C=0<br>M=0<br>Y=0<br>K=1 | C=1<br>M=0<br>Y=1<br>K=0 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 |
| 3 | C=1<br>M=0<br>Y=1<br>K=0 | C=0<br>M=0<br>Y=0<br>K=1 | C=0<br>M=0<br>Y=0<br>K=1 | C=0<br>M=0<br>Y=0<br>K=1 | C=0<br>M=0<br>Y=1<br>K=0 | C=0<br>M=0<br>Y=0<br>K=1 | C=0<br>M=0<br>Y=1<br>K=0 | C=0<br>M=0<br>Y=0<br>K=1 |
| 4 | C=0<br>M=0<br>Y=0<br>K=1 | C=0<br>M=0<br>Y=0<br>K=1 | C=0<br>M=0<br>Y=0<br>K=1 | C=0<br>M=0<br>Y=1<br>K=0 | C=0<br>M=0<br>Y=0<br>K=1 | C=0<br>M=0<br>Y=0<br>K=1 | C=0<br>M=0<br>Y=0<br>K=1 | C=0<br>M=1<br>Y=1<br>K=0 |
| 5 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 |
| 6 | C=0<br>M=0<br>Y=0<br>K=1 | C=0<br>M=0<br>Y=1<br>K=0 | C=0<br>M=0<br>Y=0<br>K=1 | C=0<br>M=0<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 |
| 7 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=1<br>Y=1<br>K=0 |

*FIG 7A*

|   | 8 | 9 | 10 | 11 | 12 | 13 | 14 | 15 |   |
|---|---|---|---|---|---|---|---|---|---|
| | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | 0 |
| | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | 1 |
| | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | 2 |
| | C=0<br>M=0<br>Y=0<br>K=1 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | 3 |
| | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | 4 |
| | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=0<br>Y=0<br>K=1 | C=0<br>M=1<br>Y=1<br>K=0 | C=0<br>M=1<br>Y=1<br>K=0 | 5 |
| | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | 6 |
| | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | C=0<br>M=1<br>Y=1<br>K=0 | 7 |

*FIG 7B*

|    | 0 | 1 | 2 | 3 | 4 | 5 | 6 | 7 |
|----|---|---|---|---|---|---|---|---|
| 8  | C=0<br>M=0<br>Y=0<br>K=1 | C=0<br>M=0<br>Y=1<br>K=0 | C=0<br>M=0<br>Y=1<br>K=0 | C=0<br>M=0<br>Y=1<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 |
| 9  | C=0<br>M=0<br>Y=1<br>K=0 | C=0<br>M=0<br>Y=0<br>K=1 | C=0<br>M=0<br>Y=1<br>K=0 | C=0<br>M=0<br>Y=1<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 |
| 10 | C=0<br>M=0<br>Y=1<br>K=0 | C=0<br>M=0<br>Y=1<br>K=0 | C=0<br>M=0<br>Y=1<br>K=0 | C=0<br>M=0<br>Y=1<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 |
| 11 | C=0<br>M=0<br>Y=1<br>K=0 | C=0<br>M=0<br>Y=1<br>K=0 | C=0<br>M=0<br>Y=1<br>K=0 | C=0<br>M=0<br>Y=1<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 |
| 12 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=1 | C=0<br>M=0<br>Y=1<br>K=0 | C=0<br>M=0<br>Y=1<br>K=0 | C=0<br>M=0<br>Y=1<br>K=0 |
| 13 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=1<br>K=0 | C=0<br>M=0<br>Y=1<br>K=0 | C=0<br>M=0<br>Y=1<br>K=0 | C=0<br>M=0<br>Y=1<br>K=0 |
| 14 | C=0<br>M=0<br>Y=0<br>K=1 | C=0<br>M=0<br>Y=0<br>K=0 | C=0<br>M=0<br>Y=0<br>K=0 | C=0<br>M=0<br>Y=0<br>K=0 | C=0<br>M=0<br>Y=1<br>K=0 | C=0<br>M=0<br>Y=1<br>K=0 | C=0<br>M=0<br>Y=1<br>K=0 | C=0<br>M=0<br>Y=1<br>K=0 |
| 15 | C=0<br>M=0<br>Y=0<br>K=0 | C=0<br>M=0<br>Y=0<br>K=0 | C=0<br>M=0<br>Y=0<br>K=0 | C=0<br>M=0<br>Y=0<br>K=0 | C=0<br>M=0<br>Y=1<br>K=0 | C=0<br>M=0<br>Y=1<br>K=0 | C=0<br>M=0<br>Y=1<br>K=0 | C=0<br>M=0<br>Y=1<br>K=0 |

FIG 7C

|  | 8 | 9 | 10 | 11 | 12 | 13 | 14 | 15 |
|---|---|---|---|---|---|---|---|---|
| 8 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 |
| 9 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 |
| 10 | C=0 M=0 Y=0 K=1 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=0 K=1 | C=0 M=0 Y=1 K=0 |
| 11 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 | C=0 M=0 Y=1 K=0 |
| 12 | C=0 M=0 Y=1 K=0 | C=0 M=0 Y=1 K=0 | C=0 M=0 Y=1 K=0 | C=0 M=0 Y=1 K=0 | C=0 M=1 Y=1 K=0 | C=0 M=1 Y=1 K=0 | C=0 M=1 Y=1 K=0 | C=0 M=1 Y=1 K=0 |
| 13 | C=0 M=0 Y=1 K=0 | C=0 M=0 Y=1 K=0 | C=0 M=0 Y=1 K=0 | C=0 M=0 Y=0 K=1 | C=0 M=1 Y=1 K=0 | C=0 M=1 Y=1 K=0 | C=0 M=1 Y=1 K=0 | C=0 M=0 Y=0 K=1 |
| 14 | C=0 M=0 Y=1 K=0 | C=0 M=0 Y=1 K=0 | C=0 M=0 Y=1 K=0 | C=0 M=0 Y=1 K=0 | C=0 M=1 Y=1 K=0 | C=0 M=1 Y=1 K=0 | C=0 M=1 Y=1 K=0 | C=0 M=1 Y=1 K=0 |
| 15 | C=0 M=0 Y=1 K=0 | C=0 M=0 Y=1 K=0 | C=0 M=0 Y=1 K=0 | C=0 M=0 Y=1 K=0 | C=0 M=1 Y=1 K=0 | C=0 M=1 Y=1 K=0 | C=0 M=1 Y=1 K=0 | C=0 M=1 Y=1 K=0 |

FIG 7D

|   | 1 | 2 | 3 | 4 |
|---|---|---|---|---|
| A | C=3<br>M=0<br>Y=3 | C=0<br>M=0<br>Y=3 | C=0<br>M=7<br>Y=7 | C=0<br>M=8<br>Y=8 |
| B | C=0<br>M=0<br>Y=3 | C=0<br>M=6<br>Y=6 | C=0<br>M=10<br>Y=10 | C=0<br>M=13<br>Y=13 |
| C | C=0<br>M=0<br>Y=14 | C=0<br>M=0<br>Y=0 | C=0<br>M=0<br>Y=15 | C=0<br>M=0<br>Y=15 |
| D | C=0<br>M=0<br>Y=0 | C=0<br>M=0<br>Y=15 | C=0<br>M=0<br>Y=15 | C=0<br>M=15<br>Y=15 |

*FIG 8A*

|   | 1 | 2 | 3 | 4 | 5 | 6 | 7 | 8 |
|---|---|---|---|---|---|---|---|---|
| A | C=0.14<br>M=0.10<br>Y=1.65 | C=0.60<br>M=0.00<br>Y=1.79 | C=0.11<br>M=0.21<br>Y=1.78 | C=0.00<br>M=1.52<br>Y=2.80 | C=0.00<br>M=2.76<br>Y=3.19 | C=0.00<br>M=3.06<br>Y=3.33 | C=0.00<br>M=3.28<br>Y=3.53 | C=0.00<br>M=3.01<br>Y=3.21 |
| B | C=0.56<br>M=0.00<br>Y=2.03 | C=0.47<br>M=0.00<br>Y=1.73 | C=0.04<br>M=0.06<br>Y=2.03 | C=0.00<br>M=0.60<br>Y=2.30 | C=0.00<br>M=0.10<br>Y=7.20 | C=0.00<br>M=0.10<br>Y=7.20 | C=0.00<br>M=0.10<br>Y=7.20 | C=0.00<br>M=0.10<br>Y=7.20 |
| C | C=0.17<br>M=0.02<br>Y=1.81 | C=0.00<br>M=0.12<br>Y=2.24 | C=0.00<br>M=0.30<br>Y=2.30 | C=0.00<br>M=1.03<br>Y=3.23 | C=0.00<br>M=1.17<br>Y=3.00 | C=0.00<br>M=2.07<br>Y=3.11 | C=0.00<br>M=2.45<br>Y=3.33 | C=0.00<br>M=1.76<br>Y=2.73 |
| D | C=0.00<br>M=0.66<br>Y=2.70 | C=0.00<br>M=1.40<br>Y=3.46 | C=0.00<br>M=1.03<br>Y=2.85 | C=0.00<br>M=0.58<br>Y=1.82 | C=0.00<br>M=0.25<br>Y=0.95 | C=0.00<br>M=0.32<br>Y=1.37 | C=0.00<br>M=0.31<br>Y=1.46 | C=0.00<br>M=0.27<br>Y=1.45 |
| E | C=0.00<br>M=0.91<br>Y=2.48 | C=0.00<br>M=0.50<br>Y=1.62 | C=0.00<br>M=0.16<br>Y=1.27 | C=0.00<br>M=0.25<br>Y=1.28 | C=0.00<br>M=0.28<br>Y=1.34 | C=0.00<br>M=0.39<br>Y=1.72 | C=0.00<br>M=0.57<br>Y=2.28 | C=0.00<br>M=0.58<br>Y=2.19 |
| F | C=0.00<br>M=0.17<br>Y=1.13 | C=0.00<br>M=0.33<br>Y=1.40 | C=0.00<br>M=0.31<br>Y=1.40 | C=0.00<br>M=0.32<br>Y=1.50 | C=0.00<br>M=0.42<br>Y=1.77 | C=0.00<br>M=0.48<br>Y=1.95 | C=0.00<br>M=0.70<br>Y=2.54 | C=0.00<br>M=0.75<br>Y=2.60 |
| G | C=0.00<br>M=0.23<br>Y=1.19 | C=0.00<br>M=0.27<br>Y=1.04 | C=0.00<br>M=0.34<br>Y=1.53 | C=0.00<br>M=0.39<br>Y=1.62 | C=0.00<br>M=0.45<br>Y=1.82 | C=0.00<br>M=0.55<br>Y=2.05 | C=0.00<br>M=0.73<br>Y=2.55 | C=0.00<br>M=0.79<br>Y=2.73 |
| H | C=0.00<br>M=0.37<br>Y=1.66 | C=0.00<br>M=0.33<br>Y=1.45 | C=0.00<br>M=0.30<br>Y=1.39 | C=0.00<br>M=0.37<br>Y=1.55 | C=0.00<br>M=0.40<br>Y=1.64 | C=0.00<br>M=0.42<br>Y=1.74 | C=0.00<br>M=0.61<br>Y=2.24 | C=0.00<br>M=0.78<br>Y=2.64 |

*FIG 9A*

|   | 0 | 1 | 2 | 3 |
|---|---|---|---|---|
| 0 | R=0.95<br>G=1.00<br>B=0.64<br>a=0.15 | R=1.00<br>G=0.90<br>B=0.62<br>a=0.16 | R=0.91<br>G=1.00<br>B=0.66<br>a=0.17 | R=0.89<br>G=1.00<br>B=0.55<br>a=0.17 |
| 1 | R=0.98<br>G=1.00<br>B=0.55<br>a=0.16 | R=0.93<br>G=1.00<br>B=0.54<br>a=0.16 | R=0.78<br>G=1.00<br>B=0.47<br>a=0.16 | R=0.88<br>G=1.00<br>B=0.53<br>a=0.18 |
| 2 | R=0.81<br>G=1.00<br>B=0.44<br>a=0.17 | R=0.88<br>G=1.00<br>B=0.44<br>a=0.16 | R=0.89<br>G=1.00<br>B=0.56<br>a=0.18 | R=0.83<br>G=1.00<br>B=0.52<br>a=0.19 |
| 3 | R=0.82<br>G=1.00<br>B=0.49<br>a=0.18 | R=0.93<br>G=1.00<br>B=0.60<br>a=0.17 | R=0.98<br>G=1.00<br>B=0.63<br>a=0.17 | R=0.83<br>G=1.00<br>B=0.56<br>a=0.19 |

*Fig. 10*

METHOD FOR COLORIZING A DIGITAL HALFTONE

BACKGROUND

1. Field of the Invention

My invention relates to digital halftoning, specifically to the replacement of transparent pixels within a monochrome digital halftone cell with colorized pixels.

2. Description of Prior Art

Digital halftones heretofore have reproduced color by utilizing four monochrome files: one each for three primary colors and one for black. Each of the four files is of comparable size and complexity, making the size and complexity of the full image difficult to transmit and store efficiently.

Nearly 150 years ago James Clerck Maxwell discovered that any color may be created by mixing three primary colors. The science of colorimetry steadily has evolved to the present. The publication of color space standards by the International Commission on Illumination (CIE) beginning in 1931 has initiated much of today's understanding of color.

Color representation may be additive (light emitting), as exemplified by a computer monitor, or subtractive (light reflecting), as exemplified by a printed page. Additive color is considered best represented by the mixing of the primary colors red, blue and green (the RGB model). Subtractive color is considered best represented by the mixing of the primary colors cyan, magenta and yellow (the CMY model).

While color may be represented by three determinants, the addition of a fourth determinant has improved results. For the sake of simplicity, this determinant may be called intensity of light or luminance. Luminance in the additive color model is contained in an Alpha channel and is known as RGBα. Luminance in the subtractive color model is contained in a Black channel (K) and is known as CMYK.

In the digital realm, the RGBα, CMYK or other four-channel model will result in increased file size if each is represented by the same number of bits.

In U.S. Pat. No. 5,504,846, "Method and Apparatus for Improved Area Demarcation in Bit Mapped Image Derived from Multi-Color Bit Mapped Image," Fisher attempted to improve a subtractive printed image derived from an additive screen image by combining adjacent areas of the same color. However, his method necessitated additional color/dither (halftone) patterns, increasing file size, differentiating it from my proposed method.

In U.S. Pat. No. 5,991,512, "Ink Relocation for Color Halftones," Shaked, et. al., attempted to reduce color halftone noise by selectively moving color areas. However, their method resulted in a blurring side-effect that necessitated enhancement procedures including suppression of their method in areas of fine detail as well as halftone edge sharpening. Such enhancement procedures also increase file size, differentiating their method from my proposed method.

SUMMARY

In accordance with the present invention, a method is shown for colorizing a digital image composed of a plurality of pixels, the method comprising:
  Receiving digital data values representative of a digital image, each pixel represented by a plurality of digital data values wherein the digital data values for the digital image have an input color density; determining an output halftone luminance for the digital image; and determining new color data for each pixel based on the input color density and the output halftone luminance. Said method wherein the digital data values for each pixel includes three color values and a luminance value; and wherein the new color data for the digital image has a size that is less than the original digital data for the digital image.

Said method wherein the output halftone luminance includes a one bit value for each pixel; wherein the one bit value for each pixel is represented by one of two values; and wherein the values are transparent and black.

Said method wherein determining new color data for each pixel includes: selecting a region of the digital image; summing digital data for each color within the region creating a summed value for that color; based on the summed value for each color, determining new color values for each halftone value that is transparent within the region. The method further comprising: summing digital data for each color within a subregion creating a sub-region summed value; wherein the sub-region summed value and the summed value are used to determine the new color values.

A method for colorizing a digital image wherein each pixel of the digital image has at least two color values and a luminance value, the method comprising: determining a halftone representation of the digital image based upon the luminance values wherein each pixel is either black or non-black; dividing the digital image into a plurality of regions; and determining color values for the non-black pixels based on a color density of the region.

Said method wherein the output luminance and color density of the regions are of a digital data size less than the data size of the original luminance and color values of the original input regions. The method wherein the luminance value and the color values of the region determine an output color density of the region. The method wherein the output color density of the region is assigned to all non-black pixels within the region.

A computer program product on a computer readable medium having computer code thereon for determining color values for a digital image, the computer code comprising: computer code for receiving digital data values representative of a digital image, each pixel represented by a plurality of digital data values wherein the digital data values for the digital image have an input color density; computer code for determining an output halftone luminance for the digital image; and computer code for determining new color data for each pixel based on the input color density and the output halftone luminance.

Said computer code wherein the new color data for the digital image has a size that is less than the original data for the digital image. The computer code wherein the output halftone luminance for the digital image is represented by the values black and transparent for each pixel. The computer code wherein the output halftone luminance and the input color density determines a new color density of each transparent pixel.

An apparatus for colorizing a digital image, the apparatus comprising: a receiver for digital data values representative of a digital image, each pixel represented by a plurality of digital data values wherein the digital data values for the digital image have an input color density; a halftone module for determining an output halftone luminance for the digital image; a new color data module for determining new color data for each pixel based on the input color density and the output halftone luminance.

Said apparatus wherein the halftone module represents the output halftone luminance for the digital image by the values black and transparent for each pixel. An apparatus wherein the new color data module includes a color intensity quantizer that determines the new color density of each transparent pixel. An apparatus comprising the new color data module includes a colorized halftone module that combines the output halftone luminance and the new color data for the digital image to a size that is less than the original data for the digital image.

In accordance with the present invention, an output image is produced that:

a.) reduces the total file size and complexity of a digital color image for more efficient transmission and storage.

b.) enables the scalability of total file size and complexity of a digital color image to the amount necessary for sufficient human vision perception prior to storage or transmission.

c.) enables the scalability of total file size and complexity of a digital color image to the amount necessary for efficient display on a particular computer monitor or printer prior to storage or transmission.

c.) utilizes the synergy between color and luminance inherent within the input image enabling the available space for color within the output luminance halftone to not exceed that necessary to allocate all of the input color information.

c.) accomplishes the above by means of a digital computer.

DRAWINGS

Drawing Figures

FIG. 2A shows a portion of an image, a bitmap 8-pixels-by-8-pixels, using four channels per pixel.

FIG. 2B shows another portion of the same image, a four-channel bitmap 8-pixels-by-8-pixels that is adjacent and right of the bitmap in FIG. 2A.

FIG. 2C shows another portion of the same image, a four-channel bitmap 8-pixels-by-8-pixels that is adjacent and below the bitmap in FIG. 2A.

FIG. 2D shows another portion of the same image, a four-channel bitmap 8-pixels-by-8-pixels that is adjacent and right of the bitmap in FIG. 2C.

FIG. 4A shows the four-channel bitmap in FIGS. 2A-2D inclusive, summing only the cyan, magenta and yellow values for each of 16 contained cells of dimensions 4-pixels-by-4-pixels, measured to hundredths of a whole pixel (two decimal places).

FIG. 5 shows a new view of FIG. 3, summing the black and transparent values for each of 16 contained cells of dimension 4 pixels-by-4-pixels, measured to whole pixels.

FIG. 6 shows the results of the invention's processing and assigning of cyan, magenta and yellow values for each of 16 contained cells of dimension 4-pixels-by-4-pixels, with each primary color described by a single bit.

FIG. 7A shows the halftone colorization output of FIG. 2A in which each of the four channels of each pixel is described by a single bit.

FIG. 7B shows the halftone colorization output of FIG. 2B in which each of the four channels of each pixel is described by a single bit.

FIG. 7C shows the halftone colorization output of FIG. 2C in which each of the four channels of each pixel is described by a single bit.

FIG. 7D shows the halftone colorization output of FIG. 2D in which each of the four channels of each pixel is described by a single bit. The combined area of the output image is a four-channel bitmap 16-pixels-by-16-pixels.

FIG. 8A shows the output bitmap as depicted in FIG. 7A-7D inclusive, summing only the cyan, magenta and yellow values for each of 16 contained cells of dimension 4-pixels-by-4-pixels, measured to whole pixels, as a comparison to FIG. 4A.

FIG. 9A shows the bitmap of FIG. 4A in which the size of the colorization cells is 2-pixels-by-2-pixels for 64 contained cells.

FIG. 10 shows a portion of a new four-channel input bitmap in which the four channels are designated the primary colors Red (R), Green (G), and Blue (B), plus a transparency or luminance channel Alpha (α).

DETAILED DESCRIPTION

Description-FIGS. 1A-E

A Receiver for Digital Image (100) receives a color image. The grayscale or luminance data is sent to a Halftone Generator (200). The color density data is sent to a Color Intensity Quantizer (300) along with halftone data from the Halftone Generator (200). The halftone data and the quantized color intensity data is combined to yield a Colorized Halftone (400).

The Receiver for Digital Image (100) system receives a Four Channel Color Bitmap (101) containing an input image's pixels with each pixel described by levels of grayscale and three primary colors. The Four Channel Color Bitmap's information is split into four separate bitmaps: the Grayscale Bitmap (102), Primary Color 1 Bitmap (103), Primary Color 2 Bitmap (104), and Primary Color 3 Bitmap (105).

The Halftone Generator (200) system processes the Grayscale Bitmap (102) information by any halftone method into a bi-level Halftone (201) in which the two colors are "black" and "transparent". The minimum square halftone cell necessary to achieve grayscale is 2-pixels-by-2-pixels. A larger cell is assigned for colorization, for example, a square cell 4-pixels-by-4-pixels. Within this larger cell, the amount of transparency becomes the Luminance Factor (202).

A Color Intensity Quantizer (300) system includes a Quantizer (301) that uses this Luminance Factor (202) to assign a 1-bit descriptor for each of the three primary colors to each larger cell, generating a Three Channel Color Bitmap (302). This Three Channel Color Bitmap (302) then is combined with the previously-derived Halftone (201) to assign color to each transparent pixel in each larger cell, generating a Colorized Halftone (401) at a global 1:1 pixel resolution to the original input image.

A digital Computer (402) or other apparatus may be used to Store and/or Transmit (403) the separate Halftone (201) and Three Channel Color Bitmap (302) files or to combine the files for display by a Monitor (404) or Printer (405).

Description-FIGS. 2-8B

FIGS. 2A, 2B, 2C and 2D each show a portion of a larger four-channel input bitmap image. The four portions are adjacent and cumulatively contain 256 pixels in a cell 16 pixels by 16 pixels. Each of the 256 pixels is described by four numbers, one each for grayscale and three primary colors. These numbers are in whole pixels carried to hundredths (two decimal places). Here the standard CMYK four-channel method is employed with the first number in each cell representing cyan (C), the second magenta (M), the third yellow (Y), and the fourth black or grayscale (K).

Figure 1A:
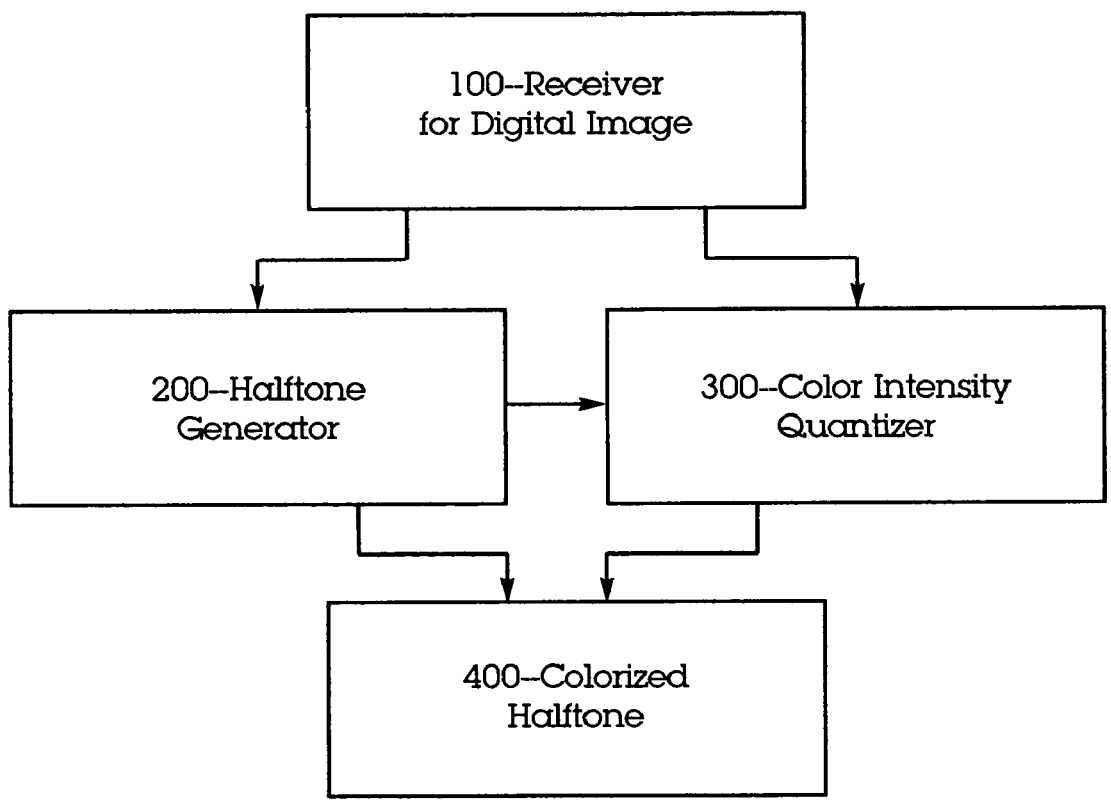
FIG. 1A shows an apparatus for a system utilizing the method of the invention.
Figure 1B:
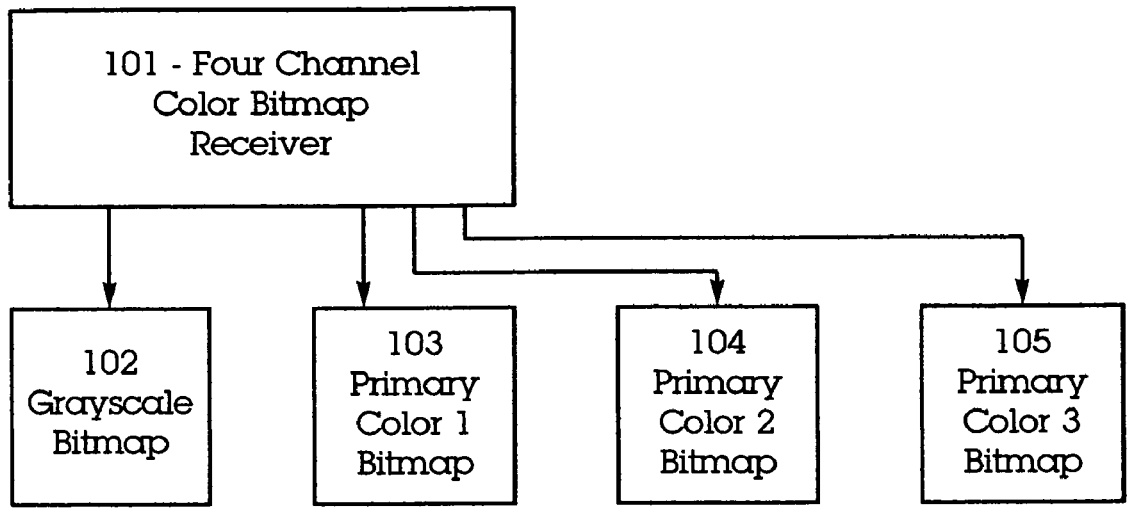
FIG. 1B shows an apparatus for subsystem 100—Receiver for Digital Image.
Figure 1C:
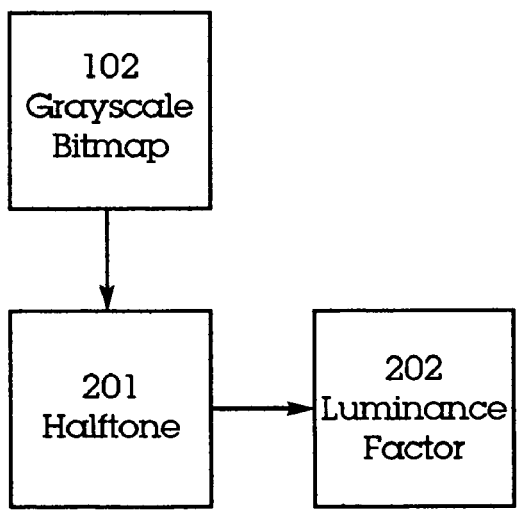
FIG. 1C shows an apparatus for 200—Halftone Generator.
Figure 1D:
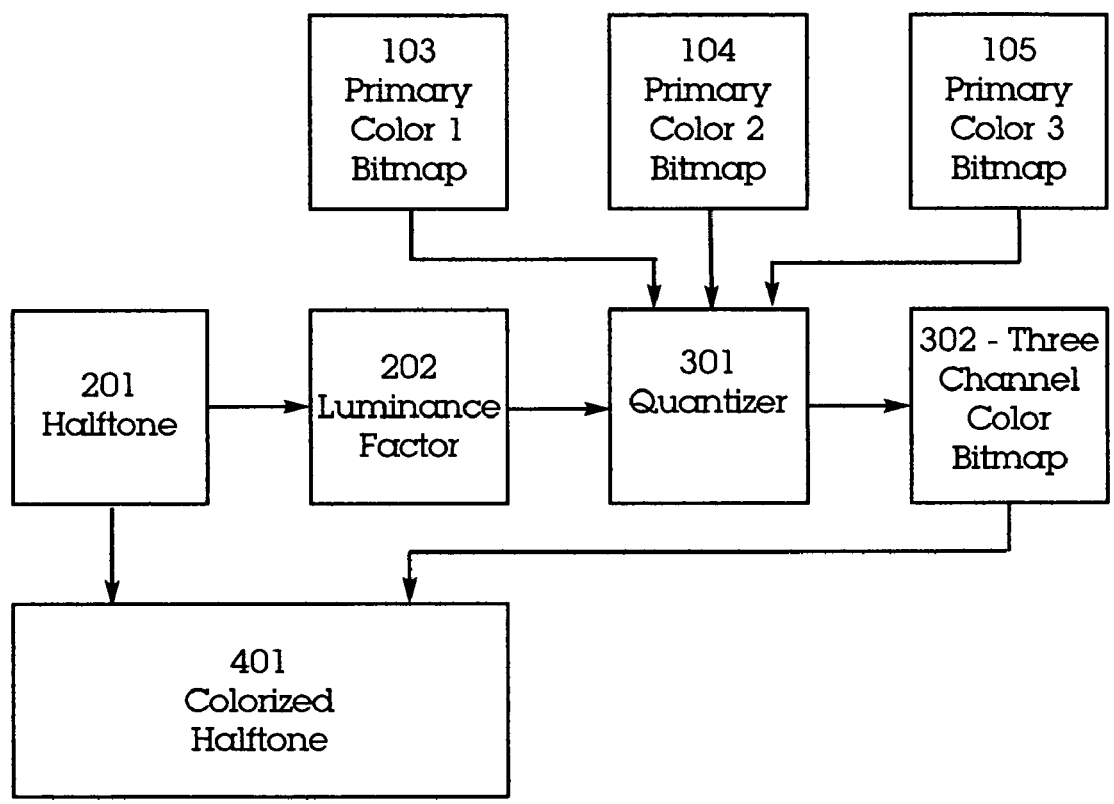
FIG. 1D shows an apparatus for subsystem 300—Color Intensity Quantizer.
Figure 1E:
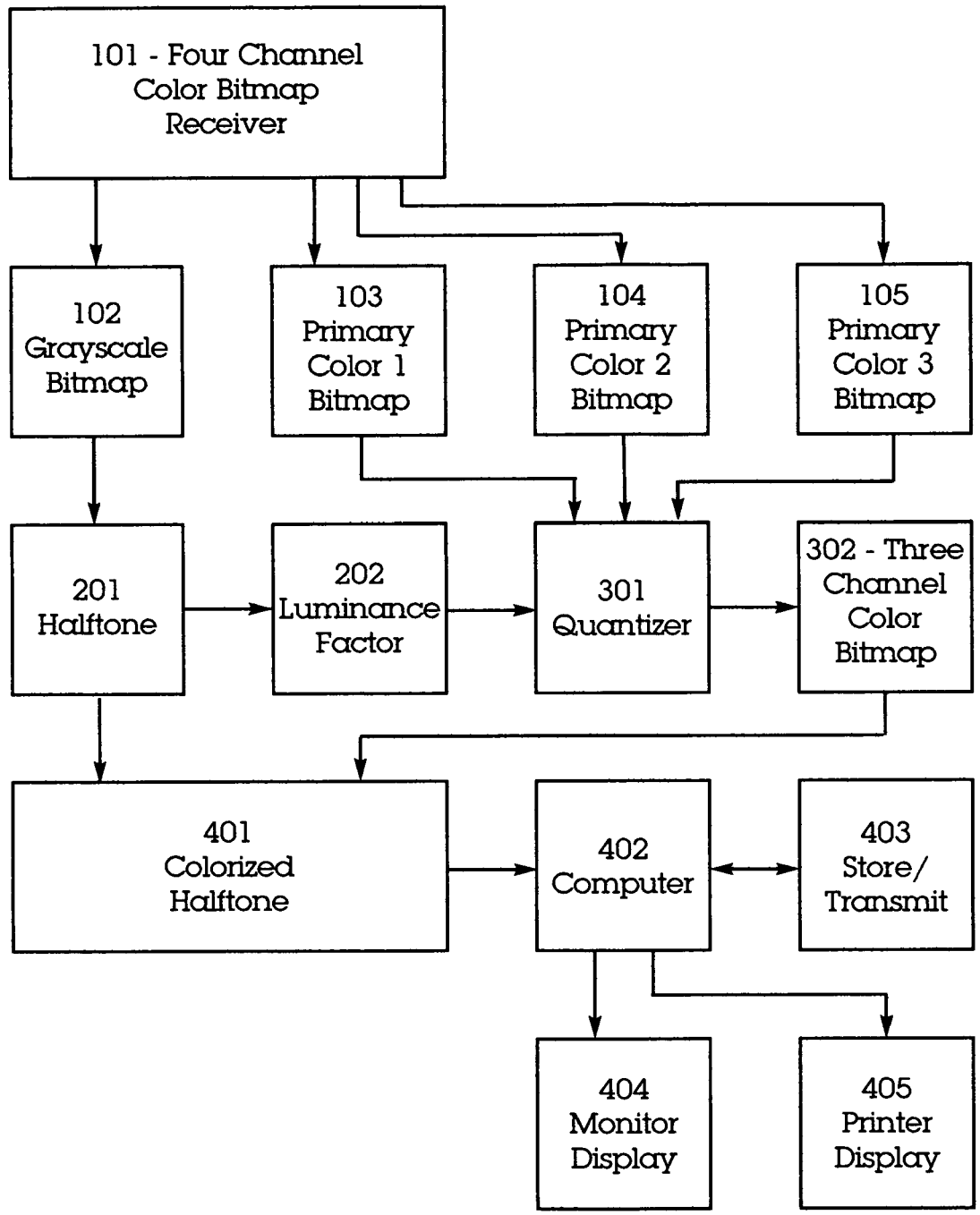
FIG. 1E shows an apparatus subsystem 400—Colorized Halftone.
Figure 3:
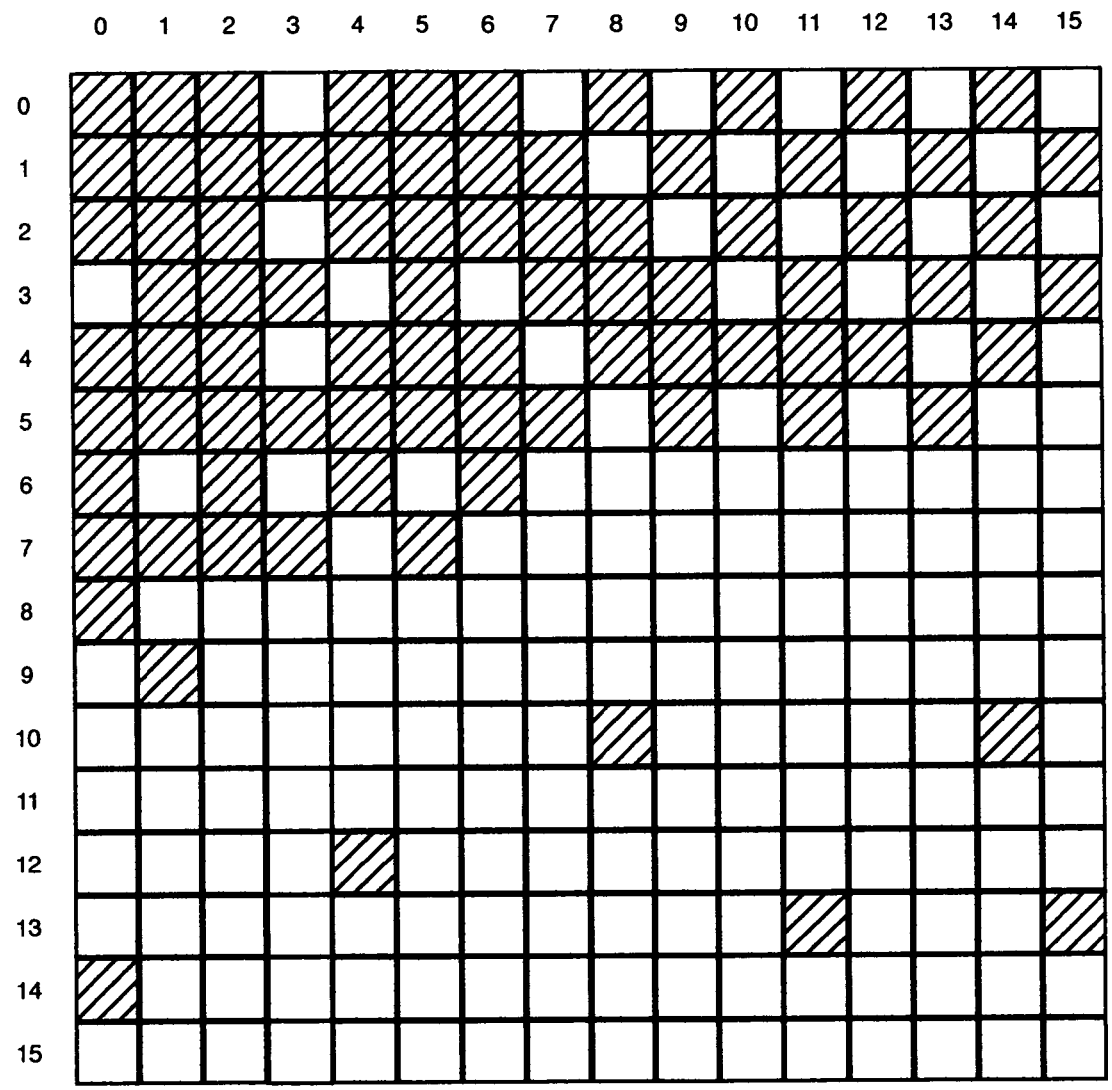
FIG. 3 shows a halftone 16-pixels-by-16-pixels constructed from the K or black channel of the four-channel bitmap.

FIG. 3 shows the bitmap of FIG. 2A-2D in which only the grayscale information (K) has been used to create a bi-level Halftone. Any comparable halftone method may be used. Here the halftoning methods described in U.S. Pat. No. 6,002,493 "Method for Reproducing an Image" (Case) and U.S. Patent Application No. 20050179950 "Reverse Diffusion Digital Halftoning Quantization" (Case) are utilized. Note that the bi-level halftone's two colors are black and transparent.

FIG. 4A shows the bitmap of FIG. 2A-2D in which only the color information has been used. The bitmap has been combined into 16 contained cells of dimensions 4-pixels-by-4 pixels. In each of these cells the three primary color values for the contained 16 pixels have been summed, measured to hundredths of a whole pixel (two decimal places).

Figure 4B:
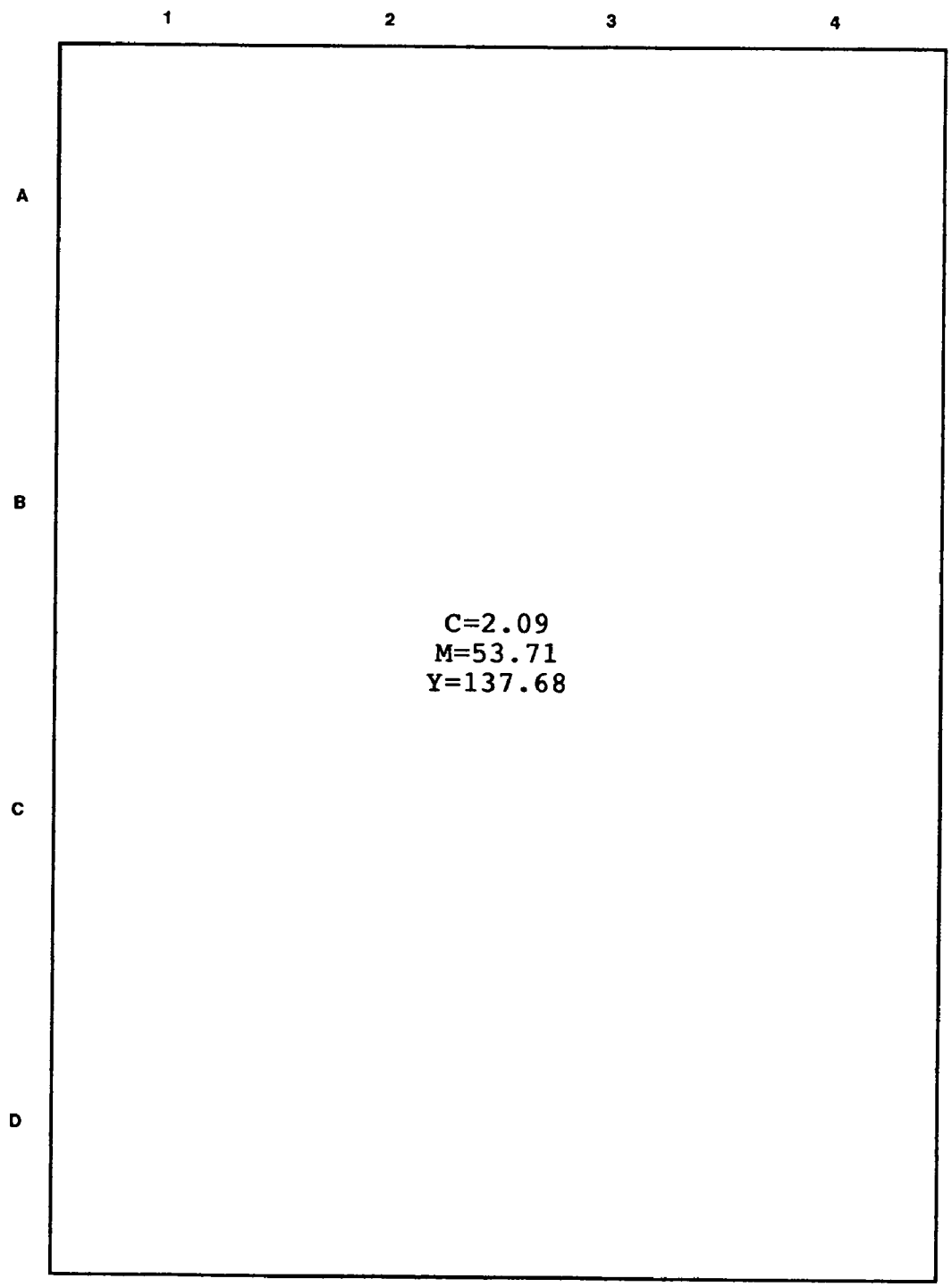
FIG. 4B shows a new view of FIG. 4A, summing the cyan, magenta and yellow values for one contained cell of dimensions 16-pixels-by-16-pixels, measured to hundredths of a whole pixel (two decimal places).

FIG. 4B shows the bitmap of FIG. 4A combined into one contained cell of dimensions 16-pixels-by-16-pixels in which the three primary color values for the contained 256 pixels have been summed, measured to hundredths of a whole pixel.

FIG. 5 shows the bi-level halftone of FIG. 3 reconfigured to 16 contained cells of dimensions 4-pixels-by-4-pixels. Within each 16 pixel cell, the number of black pixels (B) and transparent pixels (T) are summed. The number of transparent pixels then is used as a Luminance Factor.

FIG. 6 shows the cells of FIG. 4A quantized by the method of the invention using the Luminance Factor of the cells of FIG. 5 to yield a Three Channel Color Bitmap. Each primary color of this bitmap is described by a single bit.

FIGS. 7A, 7B, 7C and 7D show the corresponding pixels of FIGS. 2A, 2B, 2C and 2D respectively in which the Three Channel Color Bitmap of FIG. 6 has been combined with the bi-level Halftone of FIG. 3. Each black pixel of FIG. 3 is black with no color, but each transparent pixel of FIG. 3 has been colorized by the color information in the corresponding area of FIG. 6, resulting in a Colorized Halftone. Note that each pixel's CMYK level is described by a single bit and that in the case of the absence of black or a color, the pixel is considered to be white. Compare FIGS. 7A-7D to FIGS. 2A-2D.

FIG. 8A shows the bitmap of FIGS. 7A-7D in which only the color information has been used. This bitmap has been combined into 16 contained cells of dimensions 4-pixels-by-4 pixels. In each of the cells, the three primary color values for the contained 16 pixels have been summed, measured to the whole pixel. Compare FIG. 8A to FIG. 4A.

Figure 8B:
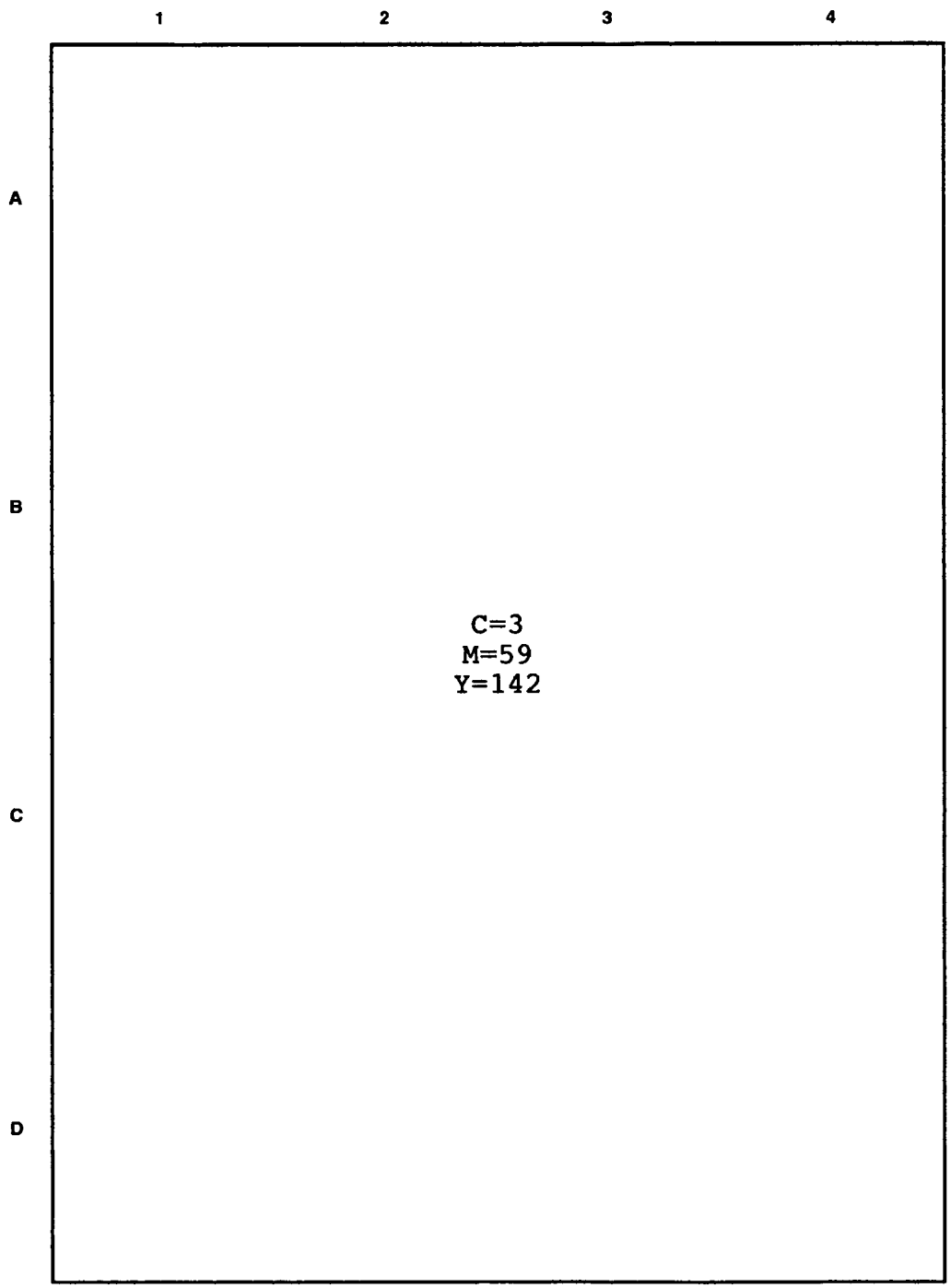
FIG. 8B shows a new view of FIG. 8A, summing the cyan, magenta and yellow values for one contained cell of dimensions 16-pixels-by-16-pixels, measured to whole pixels, as a comparison to FIG. 4B.

FIG. 8B shows the bitmap of FIG. 8A combined into one contained cell of dimensions 16-pixels-by-16 pixels in which the three primary color values for the contained 256 pixels have been summed, measured to the whole pixel. Compare to FIG. 4B.

Figure 9B:
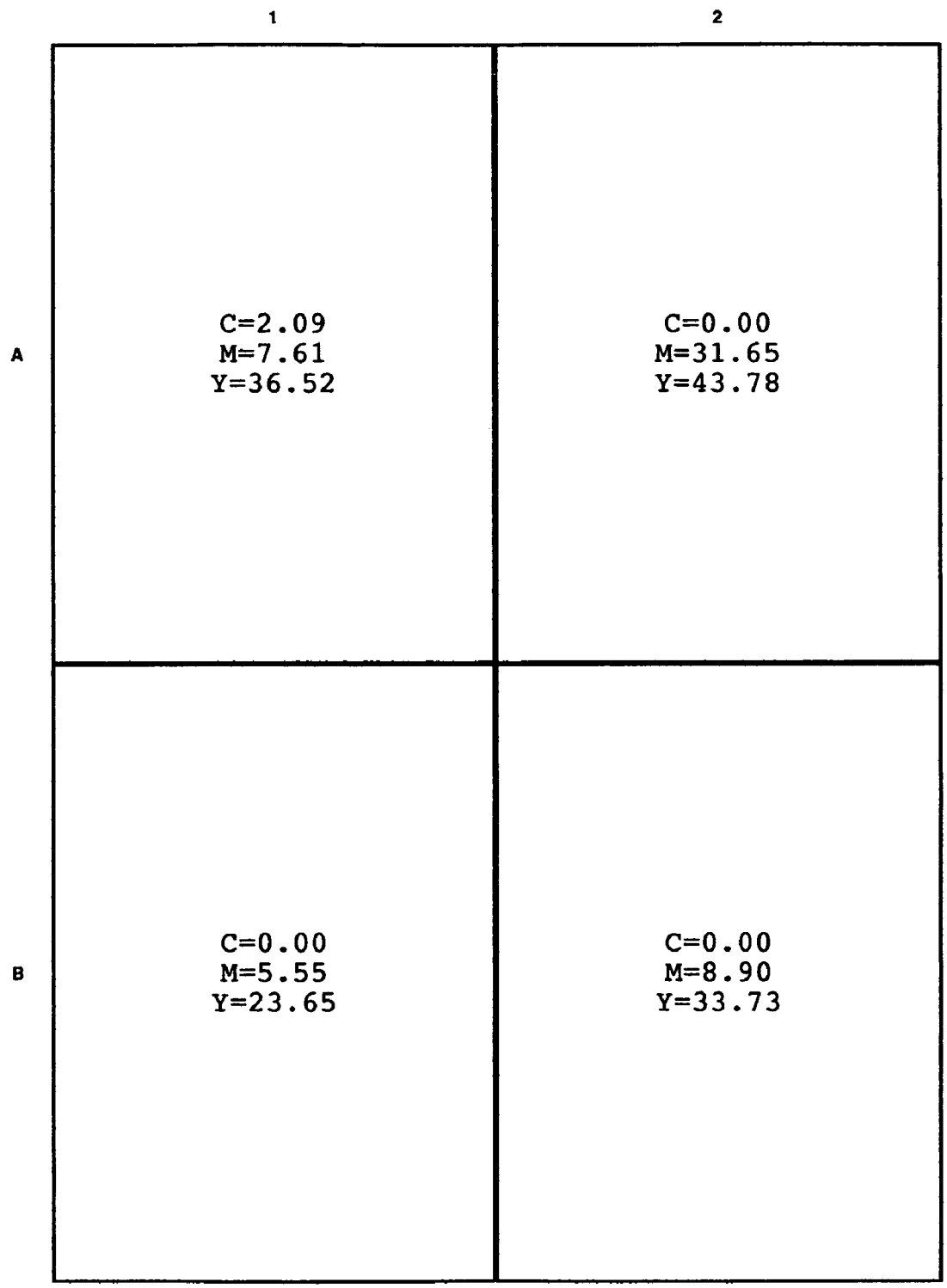
FIG. 9B shows the bitmap of FIG. 4A in which the size of the colorization cells is 8-pixels-by-8-pixels for four contained cells.

Description-FIGS. 9A-9B

FIG. 9A shows the bitmap of FIG. 4A in which the size of the colorization cells is 2-pixels-by-2-pixels for 64 contained cells.

FIG. 9B shows the bitmap of FIG. 4A in which the size of the colorization cells is 8-pixels-by-8-pixels for four contained cells.

Description-FIG. 10

FIG. 10 shows a portion of a new four-channel input bitmap in which the four channels are designated the primary colors Red (R), Green (G), and Blue (B), plus a transparency or luminance channel Alpha (α).

Operation

Operation—FIGS. 2A-D, 3, 4A-B, 5, 6, 7A-D, 8A-B

The method of my invention acts upon an input four-channel bitmap. A portion of this bitmap of size 16-pixels-by-16-pixels is depicted in FIGS. 2A, 2B, 2C and 2D. Each pixel of the bitmap is described by the amount of luminance and the amount of each of three primary colors. Here, the standard CMYK model is used with each pixel described by amounts of Cyan (C), Magenta (M), and Yellow (Y) as the three primary colors and the amount of Black (B) as luminance. The amounts are in whole pixels carried to hundredths of a pixel. Please note: The amount of each primary color is designated by at least two or more digital bits. Here seven bits are used to designate hundredths of a pixel.

The black pixel amounts then are used to create a digital halftone depicted in FIG. 3 in which each pixel of the output bitmap is described by a single bit. The two possible colors of each single-bit pixel are designated as black and transparent. Any comparable digital halftoning method may be utilized. Here the methods described in U.S. Pat. No. 6,002,493 "Method for Reproducing an Image" (Case) and U.S. Patent Application No. 20050179950 "Reverse Diffusion Digital Halftoning Quantization" (Case) are used.

The primary color amounts then are aggregated for multi-pixel cells derived from the 16-pixel-by-16-pixel input four channel bitmap. FIG. 4A depicts sixteen multi-pixel cells each 4 pixels-by-4-pixels. Within each cell, the primary color amounts are summed to whole pixels expressed in hundredths. Note that the cells are labeled 1-4 across and A-D down.

The digital halftone depicted in FIG. 3 then similarly is combined into multi-pixel cells. FIG. 5 shows sixteen multi-pixel cells each 4 pixels-by-4-pixels corresponding to the cells depicted in FIG. 4A. Note again that the cells are labeled 1-4 across and A-D down. (Please note: FIG. 4B shows one contained 16-pixel-by-16 pixel cell derived from FIG. 4A, for the purpose of later comparison and checking.) Each cell of FIG. 5 is designated an amount of Black (B) and an amount Transparent (T), summed from the pixels in FIG. 3, with the results expressed in whole pixels. The amount Transparent for each cell is designated the Luminance Factor for determining color placement.

The amounts of each primary color in FIG. 4A then are linked to the Luminance Factor (T) from FIG. 5. The levels of three primary colors of each of sixteen 4-pixel-by-4-pixel cells are sorted from highest to lowest, causing the realignment of each cell's linked Luminance Factor. A table of ordered cumulative Luminance Factors is derived. A global total for each primary color is obtained by summing the values of the sixteen cells. This total is rounded to the nearest cumulative Luminance Factor to determine which cells are designated that color.

Each of the cell's three primary colors then is described by a single bit. All of the cells included in the selected cumulative Luminance Factor are designated a color by a one or a zero. All of the cells not included in the selected cumulative Luminance Factor are designated as having no color by the single bit's opposite. Thus each cell has a three-bit designation, a single bit for each primary color as shown in FIG. 6. This designation is then assigned to each transparent pixel in the corresponding cell of the original bi-level halftone as shown in FIGS. 7A-7D, inclusive.

TABLE 1A

| Cell | Cyan | Luminance Factor |
|---|---|---|
| A1 | 1.77 | 3 |
| A2 | 0.15 | 3 |
| A3 | 0.00 | 7 |
| A4 | 0.00 | 8 |
| B1 | 0.17 | 3 |
| B2 | 0.00 | 6 |
| B3 | 0.00 | 10 |
| B4 | 0.00 | 13 |
| C1 | 0.00 | 14 |
| C2 | 0.00 | 16 |
| C3 | 0.00 | 15 |
| C4 | 0.00 | 15 |
| D1 | 0.00 | 15 |
| D2 | 0.00 | 15 |
| D3 | 0.00 | 15 |
| D4 | 0.00 | 15 |

TABLE 1B

| Cell | Cyan | Luminance Factor | Cumulative L.F. |
|---|---|---|---|
| A1 | 1.77 | 3 | 3 |
| B1 | 0.17 | 3 | 6 |
| A2 | 0.15 | 3 | 9 |
| A4 | 0.00 | 8 | 17 |
| D1 | 0.00 | 15 | 32 |
| C4 | 0.00 | 15 | 47 |
| C3 | 0.00 | 15 | 62 |
| D4 | 0.00 | 15 | 77 |
| D3 | 0.00 | 15 | 92 |
| D2 | 0.00 | 15 | 107 |
| B3 | 0.00 | 10 | 117 |
| B2 | 0.00 | 6 | 123 |
| A3 | 0.00 | 7 | 130 |
| C2 | 0.00 | 16 | 146 |
| C1 | 0.00 | 14 | 160 |
| B4 | 0.00 | 13 | 173 |
|  | 2.09 |  |  |

In Table 1A, the cyan levels and the linked luminance factors are displayed for each of the sixteen 4-pixel-by-4 pixel cells in FIG. 4A. In Table 1B, Table 1A is sorted from highest to lowest color density and the cyan levels are summed, yielding a total of 2.09 pixels. Rounding to the nearest cumulative luminance factor of 3, only cell A1 will contain a cyan designation upon output.

The cumulative input level of cyan, 2.09 pixels, divided by 256 pixels in the global cell yields a global cyan input level of 0.82 percent. The cumulative output level of cyan, 3 pixels, divided by 256 pixels in the global cell yields a global cyan output level of 1.17 percent. The global cyan error is −0.35 percent.

TABLE 2A

| Cell | Magenta | Luminance Factor |
|---|---|---|
| A1 | 0.10 | 3 |
| A2 | 2.39 | 3 |
| A3 | 10.40 | 7 |
| A4 | 12.65 | 8 |
| B1 | 2.18 | 3 |
| B2 | 2.94 | 6 |
| B3 | 3.81 | 10 |
| B4 | 4.79 | 13 |
| C1 | 1.98 | 14 |
| C2 | 1.04 | 16 |
| C3 | 1.57 | 15 |
| C4 | 2.60 | 15 |
| D1 | 1.13 | 15 |
| D2 | 1.40 | 15 |
| D3 | 1.82 | 15 |
| D4 | 2.91 | 15 |

TABLE 2B

| Cell | Magenta | Luminance Factor | Cumulative L.F. |
|---|---|---|---|
| A4 | 12.65 | 8 | 8 |
| A3 | 10.40 | 7 | 15 |
| B4 | 4.79 | 13 | 28 |
| B3 | 3.81 | 10 | 38 |
| B2 | 2.94 | 6 | 44 |
| D4 | 2.91 | 15 | 59 |
| C4 | 2.60 | 15 | 74 |
| A2 | 2.39 | 3 | 77 |
| B1 | 2.18 | 3 | 80 |
| C1 | 1.98 | 14 | 94 |
| D3 | 1.82 | 15 | 109 |
| C3 | 1.57 | 15 | 124 |
| D2 | 1.40 | 15 | 139 |
| D1 | 1.13 | 15 | 154 |
| C2 | 1.04 | 16 | 170 |
| A1 | 0.10 | 3 | 173 |
|  | 53.71 |  |  |

In Table 2A, the magenta levels and the linked luminance factors are displayed for each of the sixteen 4-pixel-by-4-pixel cells in FIG. 4A. In Table 2B, Table 2B is sorted from highest to lowest color density and the magenta levels are summed, yielding a total of 53.71 pixels. Rounding to the nearest cumulative luminance factor of 59, cells A4, A3, B4, B3, B2 and D4 will contain a magenta designation upon output.

The cumulative input level of magenta, 53.71 pixels, divided by 256 pixels in the global cell yields a global cyan input level of 20.98 percent. The cumulative output level of magenta, 59 pixels, divided by 256 pixels in the global cell yields a global magenta output level of 23.05 percent. The global magenta error is −2.07 percent.

TABLE 3A

| Cell | Yellow | Luminance Factor |
|---|---|---|
| A1 | 7.20 | 3 |
| A2 | 8.91 | 3 |
| A3 | 12.53 | 7 |
| A4 | 13.88 | 8 |

TABLE 3A-continued

| Cell | Yellow | Luminance Factor |
|------|--------|------------------|
| B1 | 10.21 | 3 |
| B2 | 10.20 | 6 |
| B3 | 8.43 | 10 |
| B4 | 8.94 | 13 |
| C1 | 6.77 | 14 |
| C2 | 5.45 | 16 |
| C3 | 6.78 | 15 |
| C4 | 9.61 | 15 |
| D1 | 5.34 | 15 |
| D2 | 6.09 | 15 |
| D3 | 7.18 | 15 |
| D4 | 10.19 | 15 |

TABLE 3B

| Cell | Yellow | Luminance Factor | Cumulative L.F. |
|------|--------|------------------|-----------------|
| A4 | 13.88 | 8 | 8 |
| A3 | 12.53 | 7 | 15 |
| B1 | 10.21 | 3 | 18 |
| B2 | 10.20 | 6 | 24 |
| D4 | 10.19 | 15 | 39 |
| C4 | 9.61 | 15 | 54 |
| B4 | 8.94 | 13 | 67 |
| A2 | 8.91 | 3 | 70 |
| B3 | 8.43 | 10 | 80 |
| A1 | 7.18 | 3 | 83 |
| D3 | 6.78 | 15 | 98 |
| C3 | 6.77 | 15 | 113 |
| C1 | 6.09 | 14 | 127 |
| D2 | 5.45 | 15 | 142 |
| C2 | 5.30 | 16 | 158 |
| D1 | 0.00 | 15 | 173 |
| | 137.68 | | |

In Table 3A, the yellow levels and the linked luminance factors are displayed for each of the sixteen 4 pixel-by-4-pixel cells in FIG. 4A. In Table 3B, Table 3A is sorted from highest to lowest color density and the yellow levels are summed, yielding a total of 137.71 pixels. Rounding to the nearest cumulative luminance factor of 142, cells A4, A3, B1, B2, D4, C4, B4, A2, B3, A1, D3, C3, C1 and D2 will contain a yellow designation upon output.

The cumulative input level of yellow, 137.68 pixels, divided by 256 pixels in the global cell yields a global yellow input level of 53.78 percent. The cumulative output level of yellow, 142 pixels, divided by 256 pixels in the global cell yields a global yellow output level of 55.47 percent. The global yellow error is −1.69 percent.

FIG. 6 shows each of the sixteen 4 pixel-by-4-pixel cells with their three-bit CMY designations. Please note that while three bits may contain 2^3 or 8 permutations, only seven are used here. They are: 100 (Cyan), 010 (Magenta), 001 (Yellow), 011 (Red), 110 (Blue), 101 (Green), and 000 (White). 111 (Black) is not used.

In FIGS. 7A-D inclusive, the three-bit color descriptors of each cell in FIG. 6 are assigned to all transparent pixels within the cell as shown in FIG. 3 and FIG. 5. For example, in cell A1 in FIG. 6, C=1, M=0 and Y=1. In FIG. 5, the corresponding cell has 3 transparent pixels. They are shown in FIG. 3 as pixels 0,3; 2,3 and 3,0. In FIG. 7A, pixel 0,3 previously was transparent as shown by K=0. Now it is designated C=1, M=0, Y=1. Similarly, pixels 2,3 and 3,0 are now designated C=1, M=0, Y=1, and K=0. The remaining 13 black pixels in the cell are designated C=0, M=0, Y=0 and K=1.

However, in cell C1 in FIG. 6, C=0, M=0 and Y=1. In FIG. 5, the corresponding cell has 14 transparent pixels. They are shown in FIG. 3 as pixels 8,1; 8,2; 8,3; 9,0; 9,2; 9,3; 10,0; 10,1; 10,2; 10,3; 11,0; 11,1; 11,2 and 11,3. In FIG. 7A, all of these previously transparent pixels are designated C=0, M=0, Y=1, and K=0. The remaining two black pixels in the cell (pixels 8,0 and 9,1) are designated C=0, M=0, Y=0 and K=1.

FIG. 8A and FIG. 8B show a method of checking the output color levels. In FIG. 8A, primary color values in whole pixels for the sixteen contained 4-pixel-by-4-pixel cells is derived from the individual pixel information in FIGS. 7A-D, inclusive. The output levels may be compared to the input levels contained in FIG. 4A.

In FIG. 8B, the primary color levels in whole pixels for one contained cell 16-pixels-by-16-pixels is derived from the cell information in FIG. 8A. The output levels may be compared to the input levels contained in FIG. 4B. The bi-level halftone shown in FIG. 3, prior to compression, may be described by 1-bit-per-pixel.

For example, a black pixel may be described as K=1 and a transparent pixel as K=0. The 256 pixels of the described 16-pixel-by-16-pixel bitmap would take 256 bits. The method of my invention assigns a 3-bit primary color to each transparent pixel in each described 4 pixel-by-4-pixel cell. The 256 pixels of the described 16-pixel-by-16-pixel bitmap would take 16×3 or 48 bits. The sum of 256+48, or 304 bits, divided by 256 pixels means that color may be achieved by 1.19-bits-per-pixel prior to compression.

CONCLUSION, RAMIFICATIONS AND SCOPE

Accordingly, the reader will see that the method of this invention can be used to reduce the total file size and complexity of a digital color image for more efficient transmission or storage. In addition, said invention can be used to scale, prior to storage or transmission, the total file size and complexity of a digital color image to the amount necessary for sufficient human vision perception. It can also be used to scale, prior to storage or transmission, the total file size and complexity of a digital color image to the amount necessary for efficient display on a particular monitor or printer. It can be used to tap the synergy between color and luminance inherent within the input image to enable the available space for color within the output luminance halftone to not exceed that necessary to allocate all of the input color information. And it enables the foregoing to more easily be accomplished through the use of a digital computer.

Also, the inventions described herein may be embodied as computer software on a computer readable medium or may be embodied as an electronic chip or in any other electronic form. Further, embodiments may also be comprised of both computer software and electronic hardware, such as an ASIC chip or other electronic structure that includes associated memory holding electronic instructions.

In addition, the source of the input color image may include, but is not limited to: photographs, printed documents, books, magazines, billboards and advertising displays, and motion technologies such as motion pictures and television.

Furthermore, the display of the output color image may include, but is not limited to: printers, printing presses, computer monitors, televisions, projection screens, and emerging e-ink and e-paper technologies.

Although the description contains many specificities, these should not be construed as limiting the scope of the invention but as merely providing illustrations of some of the presently preferred embodiments of this invention. For example, color cell sizes may be larger or smaller depending on the color accuracy and final file size required. Also, color models other than CMYK or RGBα may be utilized for the input image.

Thus the scope of this invention should be determined by the appended claims and their legal equivalents rather than by the examples given.

I claim:

1. A method, comprising:
  receiving a digital image including a plurality of pixels, each pixel represented by one or more color values and a luminance value;
  determining an output halftone luminance for each pixel of the digital image in response to the corresponding luminance value, the output halftone luminance including a black or a transparent value for each pixel in the image;
  summing the one or more color values associated with each color within a region of the image creating a summed value for each color;
  summing the transparent values for each pixel within the region to create a luminance factor; and
  based on the summed value for each color and on the luminance factor, determining new color values for each pixel in the region having a transparent value.

2. The method according to claim 1, wherein the one or more color values includes three color values.

3. The method according to claim 1, wherein the new color values compress a size of an output digital image including the new color values relative to the digital image.

4. The method according to claim 1, wherein the output halftone luminance includes a one-bit black or transparent value for each pixel.

5. A method for colorizing a digital image composed of a plurality of pixels, the method comprising:
  receiving a digital image including a plurality of pixels, each pixel represented by a plurality of digital data values having an input color density;
  determining an output halftone luminance for each pixel in the digital image;
  determining new color data for each pixel based on the corresponding input color density and the corresponding output halftone luminance;
  selecting a region of the digital image;
  summing digital data values for each color within the region creating a summed value for each color;
  based on the summed value for each color, determining new color values for each halftone value that is transparent within the region; and
  summing digital data values for each color within a sub-region creating a sub-region summed value;
  wherein the sub-region summed value and the summed value are used to determine the new color values; and
  wherein the output halftone luminance includes a transparent or black value for each pixel.

6. A method, comprising:
  determining a halftone representation of a digital image based upon a luminance value and one or more color values for each of a plurality of pixels of the digital image, wherein each pixel of the halftone representation of the digital image is either black or non-black;
  dividing the digital image into a plurality of regions; and
  determining new color values for the non-black pixels in at least one of the plurality of regions based upon a sum of the one or more color values associated with each color within the at least one of the plurality of regions and based upon a luminance factor;
  where the luminance factor is a sum of the non-black pixels within the region.

7. The method according to claim 6, wherein new color values and an output luminance of the plurality of regions are of a digital data size less than a data size of the one or more color values and luminance value of the digital image.

8. The method according to claim 6, wherein the luminance value and the new color values of the at least one of the plurality of regions determines an output color density of the at least one of the plurality of regions.

9. The method according to claim 8, wherein the output color density of the at least one of the plurality of regions is assigned to all non-black pixels within the at least one of the plurality of regions.

10. A computer-readable medium having stored thereon, computer-executable instructions that, if executed by a device, cause the device to perform a method comprising:
  receiving a digital image including a plurality of pixels, each pixel represented by one or more input color values and an input luminance value;
  determining an output halftone luminance value for each pixel of the digital image in response to the input luminance value, the output halftone luminance value for each pixel including a black or a non-black value; and
  determining new color values for each pixel having a non-black value in a region of the digital image based on a sum of the one or more input color values for each color in the region and on a luminance factor;
  where the luminance factor is a sum of pixels within the region including the non-black value.

11. The computer-readable medium of claim 10, wherein the new color values result in an output digital image having a size that is less than a size of the digital image.

12. An apparatus, comprising:
  a receiver configured to receive a digital image having a plurality of pixels, each pixel represented by one or more input color values and an input luminance value;
  a halftone module configured to determine an output halftone luminance for the digital image based on the input luminance value for each pixel, the output halftone luminance including a black or a non-black value for each pixel in the image; and
  a new color data module configured to determine new color values for each pixel having a non-black value in a region of the digital image based on a sum of the one or more input color values for each color in the region and based on a luminance factor;
  where the luminance factor is a sum of pixels within the region having a non-black value.

13. The apparatus of claim 12, wherein the new color data module includes a color intensity quantizer configured to determine a new color density of each pixel having a non-black value.

14. The apparatus a of claim 12, wherein the new color data module includes a colorized halftone module configured to combine the output halftone luminance and the new color values to generate an output digital image having a smaller size relative to the digital image.

* * * * *

UNITED STATES PATENT AND TRADEMARK OFFICE
CERTIFICATE OF CORRECTION

| | | |
|---|---|---|
| PATENT NO. | : 7,623,264 B2 | Page 1 of 1 |
| APPLICATION NO. | : 11/356616 | |
| DATED | : November 24, 2009 | |
| INVENTOR(S) | : Robert M. Case | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 913 days.

Column 12, line 58 (Claim 14): Delete "apparatus a" and replace with --apparatus--.

Signed and Sealed this

Second Day of November, 2010

David J. Kappos
*Director of the United States Patent and Trademark Office*